(12) United States Patent
Malkamäki et al.

(10) Patent No.: US 6,527,829 B1
(45) Date of Patent: Mar. 4, 2003

(54) METHOD AND ARRANGEMENT FOR PURIFYING THE INTAKE AIR OF A GAS TURBINE

(75) Inventors: Matti Malkamäki, Vantaa (FI); Matti Lehtimäki, Tampere (FI)

(73) Assignee: Fortum Oyj, Espoo (FI)

( * ) Notice: Subject to any disclaimer, the term of this patent is extended or adjusted under 35 U.S.C. 154(b) by 0 days.

(21) Appl. No.: 09/647,600

(22) PCT Filed: Mar. 15, 2000

(86) PCT No.: PCT/FI00/00208

§ 371 (c)(1),
(2), (4) Date: Jan. 8, 2001

(87) PCT Pub. No.: WO01/69065

PCT Pub. Date: Sep. 20, 2001

(51) Int. Cl.$^7$ ............................................. B03C 3/014
(52) U.S. Cl. .................. 95/71; 55/DIG. 38; 95/73; 95/79; 96/53; 96/66; 96/70; 96/73; 96/77; 96/97
(58) Field of Search .................. 96/49, 97, 77, 96/73, 70, 66, 87, 53; 95/71, 65, 66, 75, 79, 73; 55/DIG. 38

(56) References Cited

U.S. PATENT DOCUMENTS

| | | | | |
|---|---|---|---|---|
| 3,569,751 A | * | 3/1971 | Ruhnke | 96/77 X |
| 3,668,835 A | | 6/1972 | Vicard | 55/DIG. 38 |
| 3,768,258 A | * | 10/1973 | Smith et al. | 96/97 X |
| 4,726,814 A | * | 2/1988 | Weitman | 96/77 X |
| 5,034,032 A | * | 7/1991 | Yikai et al. | 96/97 X |
| 5,055,115 A | * | 10/1991 | Yikai et al. | 96/97 X |
| 5,254,155 A | * | 10/1993 | Mensi | 96/97 X |
| 5,474,600 A | * | 12/1995 | Volodina et al. | 96/97 X |
| 5,626,652 A | * | 5/1997 | Kohl et al. | 96/49 X |
| 5,707,428 A | * | 1/1998 | Feldman et al. | 96/97 X |

FOREIGN PATENT DOCUMENTS

| | | | |
|---|---|---|---|
| DE | 1007298 | 5/1957 | |
| DE | 2006298 | 9/1970 | |
| GB | 740646 | * 11/1955 | 96/49 |
| GB | 968065 | 8/1964 | |
| JP | 5-154408 | * 6/1993 | 96/97 |
| JP | 9024298 | 1/1997 | |
| JP | 9029133 | 2/1997 | |

\* cited by examiner

Primary Examiner—Richard L. Chiesa
(74) Attorney, Agent, or Firm—Birch, Stewart, Kolasch & Birch, LLP

(57) ABSTRACT

The present invention describes a method and an arrangement for purifying the intake air of a gas turbine of solid particles and liquid droplets. According to the invention air is taken into the system of intake air passages (1, 2, 4) of the gas turbine and the particles contained in the intake air are collected by means of at least one plate filter (3) to which a collection voltage has been connected. In order to enable and enhance collection, the air is taken into at least one charging chamber (2) arranged at a distance prior to the plate filters (3) in the flow direction of the air, where an electric field is formed between at least two electrodes (5, 7) by connecting a voltage between the electrodes which exceeds the collection voltage, whereby powerful charging of the particles and at least partial removal of the water contained in the air are effected.

22 Claims, 2 Drawing Sheets

METHOD AND ARRANGEMENT FOR PURIFYING THE INTAKE AIR OF A GAS TURBINE

This application is the national phase under 35 U.S.C. §371 of PCT International Application No. PCT/FI00/00208 which has an International filing date of Mar. 15, 2000, which designated the United States of America.

BACKGROUND OF THE INVENTION

1. Field of the Invention

The invention relates to a method and apparatus for purifying the intake air of a gas turbine of solid and liquid particles.

2. Description of the Related Art

The intake air of a gas turbine compressor, i.e. the combustion air of the turbine, must be purified before is taken to the compressor. Most commonly, the intake air is purified by means of mechanical fiber filters. The purpose of such filtration is to prevent abrasive and fouling particles form entering the compressor and the turbine and thus to prevent equipment wear and tear, and to reduce the need for cleaning and maintenance. Big gas turbines used in energy production require considerable amounts of combustion air, wherefore even minute contents of impurity will lead to intensive deposition during use, and thus, the best possible combustion air filtration is desirable. Pressure losses in the intake air passage, on the other hand, reduce the efficiency of the equipment, wherefore filtration efficiency is always a compromise selected with regard to the prevailing conditions. Small water droplets and humidity are always conveyed into the compressor with the intake air. At low temperatures, the water droplets will freeze onto the surface they encounter forming greater layers of ice, which may damage the compressor blades when coming off. In the worst possible case this may break the entire compressor.

Today, different kinds of mechanical filters are almost exclusively used as the intake air filters in compressors. In these filters, the filtering matter comprises a fibrous layer which forms a labyrinth to which the impurities adhere. The filter capacity is dependent on the filter material and on the packing density of the material. In the case of a given filter material, the filtration capacity can be enhanced by increasing filter thickness or packing density by pressing the filter material into a denser form. Both ways will result in a rapid increase in the pressure losses of the filter, and the filter capacity of mechanical filters can only be increased to a given limit, and it is safe to say that in practice present fibre filters achieve complete separation of particles having a size of 1 to 5 $\mu$m. In known filters, the separation of sufficiently small particles is always incomplete. Furthermore, mechanical filters are susceptible to wetting caused by the small air-borne water droplets and the pressure losses from the air over the filter. A mechanical filter is then clogged and, at a sufficiently low temperature, it freezes. In such a case the filter must be dried by heating the intake air such that its relative humidity and temperature will allow the reevaporation of the water and ice formed back to vapour phase, and the convection thereof into the compressor along with the intake air.

The use of a greater number of efficient filtering systems has not been considered necessary but recent efficiency measurements at turbine installations reveal that even the smallest particles play a role in efficiency and service life. It is the smallest particles that cause most of the deposition in the gas turbine and the compressor, wherefore they should be removed. The proportion of minute particles in the total quantity of impurities is only fractional, but will in the long run and at large air masses in the gas turbines accumulate to a substantial total mass which may add up to even tens of kilograms annually. The deposition reduces the operating efficiency and electric output of the turbine. The reduced power is the sum of a number of factors, such as the wear and tear caused by the particles, inefficient cleaning methods resulting in a failure to remove all deposit material, the abrasive effect of cleaning, and the increased giving at the insulants and the increased leakage resulting therefrom. Even the slightest reduction in output capacity during the entire service life incurs considerable losses. The operating efficiency of the turbine is also reduced by fouling, which is why the compressor and the turbine itself must be cleaned at regular intervals. Water and different kinds of coarse powders are used for the cleaning. Washing with water, in particular, is hampered by freezing in cold conditions. The costs incurred by fouling are due to the increased need for fuel, the reduced efficiency and the washing costs of the compressor. The deposition intensity and the effects thereof are naturally dependent on the using environment and the impurity content of the intake air. Even with washes, not all impurities can be removed, and it remains a factor contributing to power losses in the range of tens of percents in just a few years. During the cold periods, preheating of intake air must be used in combination with mechanical filters to minimize the clogging caused by the wetting thereof as well as the risk of freezing caused by water droplets. The use of intake air preheating causes considerable production losses annually and results in increased operational costs due to the reduced operational efficiency.

Filter fouling leads to pressure losses when the filters are clogged by contamination, and the foul filters must be replaced periodically. The more closely meshed the filter, the greater the need for filter replacement, and filter replacement incurs costs due to the price of the filters and the down time. Conventionally, filtration has been boosted by developing the material of coarse and fine filters, and not by combining different filtration methods. In addition, electric filters have been considered so unreliable that the use thereof as an only filter has been considered too great a risk. One downside of electric filtration methods has involved humidity and the short circuits it causes. As deposit accumulates on the insulation material used in electric filters, the layer of impurities may form a conducting bridge which may conduct the current. One problematic type of deposit comprises different kinds of fibres, which due to their longitudinal shape may connect live parts to each other, thus giving rise to short-circuiting in the equipment. The occurrence of different kinds of fibres and other impurities in the intake air is affected by the conditions in the using environment of the gas turbine such as the amount of traffic, industrial establishments, and vegetation and soil type. Similarly, the capacity for damp separation varies considerably according to climate conditions. Particularly under conditions with considerable air humidity and simultaneous low temperature, ice formation on the filter plates may occur. The biggest problem related to ice formation is the detaching in big pieces of the ice formed on the plates of an electric filter, as such pieces may cause serious damage when ending up in the compressor. The freezing risk is further increased by the fact that air may cool down in the suction passages due to the pressure drop, whereby freezing may occur even with the ambient temperature above the freezing point. This is particularly problematic because warmer air may have a higher humidity content. Water reaching the plates of an electric precipitator is also harmful because it may wash off some of the deposit accumulated on the plates, which then has unprevented access into the compressor and turbine in particles of considerable size.

SUMMARY OF THE INVENTION

The aim of the present invention is to achieve a method for purifying the intake air of a gas turbine and for eliminating the need for intake air preheating without using any mechanical filter.

The invention is based on the notion of charging the intake air particles collected by an electric precipitator by means of electrodes separated from the collector plates, said electrodes having a voltage which by far exceeds the collection voltage.

According to a preferred embodiment of the invention, the intake air is charged with electrodes equipped with needle-like discharge tips, whereby the direction of the field may be selected, thus obtaining a more uniform field over the entire charge region.

More specifically, the method according to the invention is characterized by taking air into at least one charging chamber arranged at a distance before the electric precipitator in the direction of flow, and forming an electric field in the charging chamber between at least two electrodes by connecting a voltage exceeding the collection voltage between the electrodes.

The arrangement according to the invention, then, is characterized by the means for ionizing the intake air comprise at least one charging chamber containing at least two electrodes, between which the air is adapted to flow and between which an ionization voltage exceeding the collection voltage of a plate filter can be connected.

The invention achieves a separation capacity which is at least equal to that of current fiber filters even in the case of the smallest particles, simultaneously achieving reduced need for service and reduced suction air pressure losses. Water in droplet form is at least sufficiently separated before the electric precipitator used in the equipment, and thus, the problems related to humidity and freezing which have restricted the use of electric filters previously have now been solved. The equipment has such a good separation capacity of water in droplet form that it is even feasible to use a water jet to cool the intake air in hot conditions to increase efficiency. The mechanical structure and dimensions of the filter system can be varied in many ways, wherefore it can easily be fitted to replace the filter equipment in gas turbine in use today. The filtration capacity may be varied by varying the ionization and/or collection voltage, and thus, filtration efficiency can be varied depending on the impurity content of the intake air. According to an advantageous embodiment of the invention, highly efficient charging of particles and droplets is achieved, which also results in efficient collection thereof by means of the sections of the electric precipitator. The collection surface of plates of the electric precipitator is wide, wherefore they do not require frequent cleaning, because the amount of deposit collected on the plates is small compared to the distance between the plates. The need for cleaning is of course dependent on the impurity content of the air and the steadiness of flow in the cells.

BRIEF DESCRIPTION OF THE DRAWINGS

In the following, the invention is examined by means of a number of working examples and with reference to the annexed drawings.

DETAILED DESCRIPTIONS

In the present application the term 'particle' is used of all components contained in air apart from gaseous ones, such as solid particles, liquid droplets and fibres.

Figure 1:
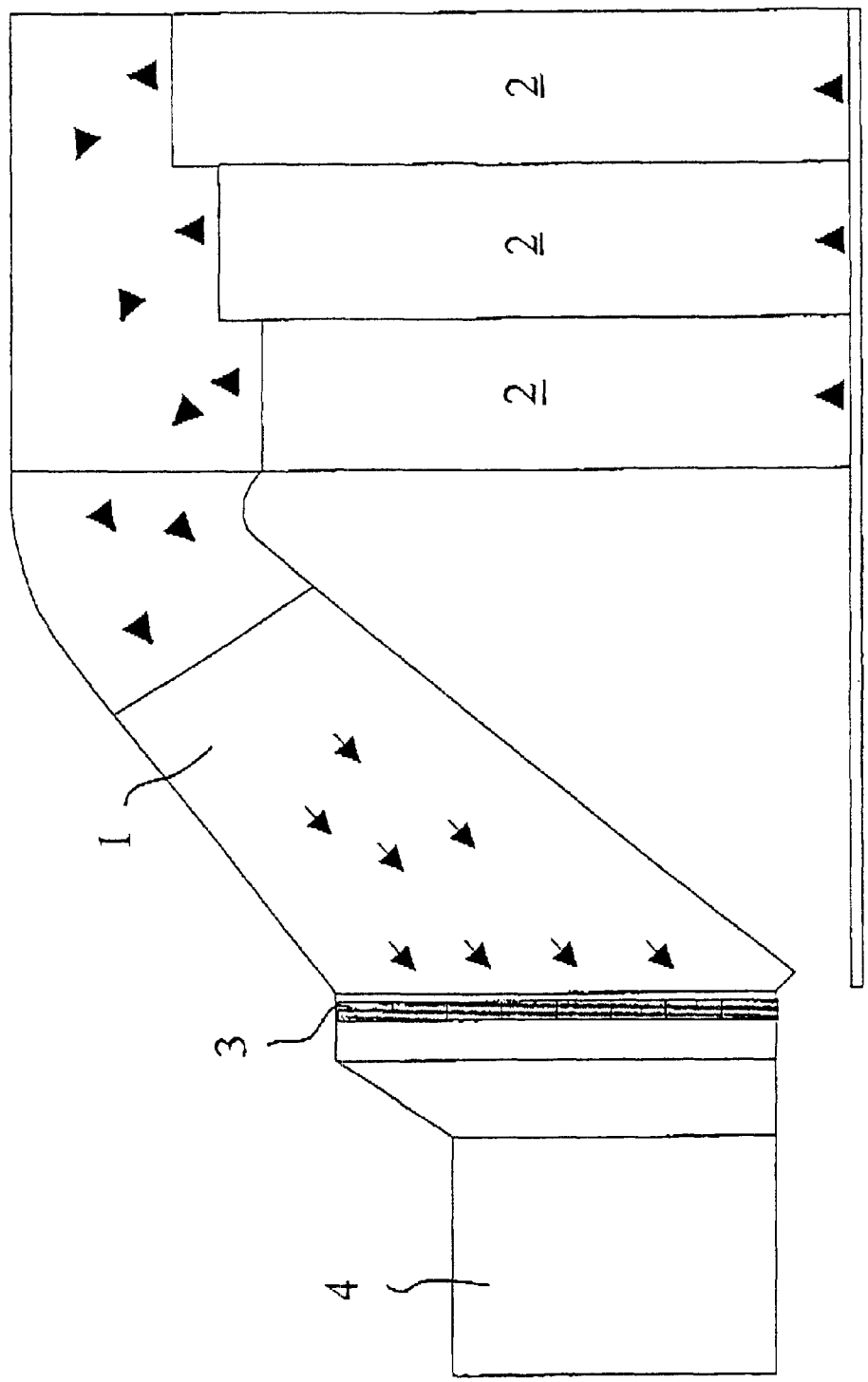
FIG. 1 is a view of a filtration system according to the invention.

The apparatus in FIG. 1 comprises an intake air passage 1, charging chambers 2 being fitted at the beginning thereof, whereby all air entering the intake air passage 1 flows through the chambers. The intake air passage 1 forms a flow passage for ionized air and conventional electric collector sections or electric precipitator 3 are arranged at the end thereof. As the particles in the air to be purified are effectively charged in the charging chambers 2, corona wires are not used in the electric precipitators for charging the particles, but instead, the particles charged in the charging chamber 2 can be collected directly onto the plates. The purified air is taken to the gas turbine compressor along the passage 4.

Any electrode structure may be used for charging the particles which allows the use of charge voltages in the range of 50 kV to 250 kV as well as a large air slot. In this case, however, the problem arises of achieving a uniform electric field in the charging chamber 2. In the case of planar or threadlike electrodes corona discharges will easily occur only in a given region containing the easiest flow path. Another problem resides in the easily occurring breakdowns. Thus, it is of advantage to use electrodes equipped with needle discharge tips for charging air, the particles in air to be precise, whereby a discharge always takes place at the tip of the electrodes. Structures well suited for this purpose are described in PCT Application No. FI99/00315.

Figure 2:
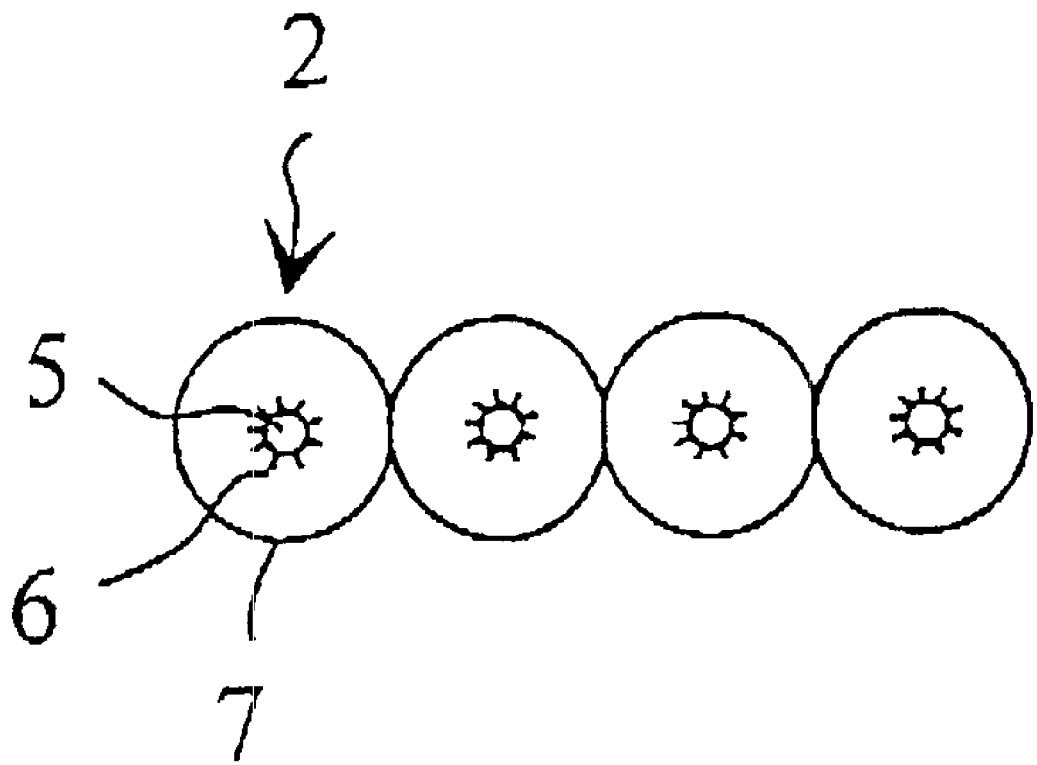
FIG. 2 represents an advantageous device for charging the particles in the intake air.

FIG. 2 depicts a charging chamber described in the above-cited application. Such charging devices 2 are usually fitted in a vertical position in accordance with FIG. 1 even though other positions are possible too, and the gas flow to be purified is taken to the vertically arranged ionization chambers 2 at their lower part. An electrode 5 is arranged in each charging chamber 2 in the longitudinal direction thereof with ionization needles (electrode tips) 6 attached thereto. The ionization needles 6 may be made of e.g. metal wire. High voltage is connected to the electrode 5 whereby a corona discharge is generated at the ends of the ionization needles 6, resulting in a continuous electron flow from the needles to a counter-electrode. The shape of the ion beams is affected e.g. by the number of ionization needles 6 and the distance therefrom to the counter-electrode. In order to guarantee the best possible charging result, numerous ionization needles should be provided and the beam fields they form should preferably overlap, eliminating the occurrence of intermediate areas where the particles are not charged. The voltage of the electric current conveyed to the electrode 5 is typically in the range from 50 to 250 kV, but a solution according to the invention allows the use of a higher or a lower voltage. The wall 7 of the charging chamber 2 is grounded, whereby the ion beams, due to the potential difference between the ionization needles 6 and the wall 7, are directed towards the wall. Thus, the wall 7 constitutes the other electrode, i.e. the counter-electrode. It is possible to connect a potential other than ground potential to this electrode, but connecting it to ground is the simplest solution. The gas to be purified flows upwards in the flow passages 2, whereby it meets the ion beams formed at the ionization needles 6, which bring about mechanical and electrical forces causing the separation of material and substances in the gas flow which are not in gaseous phase, such as particles and water droplets, from the flow, said materials being conveyed to the walls 7 of the charging chambers. At the same time the water droplets separated from the gas flow rinse particles deposited on the walls into a well arranged e.g. under the ionization chamber 2. Eventually, the partly purified and ionized gas is conducted out of the charging chambers 2 at the top part thereof further to the electric plate filters which then collect the rest of the charged particles. In such an arrangement the air gaps between the electrodes are great, even from 100 to 1000 mm.

The aim is to keep the flow resistance and the pressure losses of the gas flow to be purified as low as possible, wherefore the charging chambers 2 have a wide cross-section with regard to the amount of gas used, and a flow which is as uniform and disturbance-free as possible is striven for in the chambers 2. The flow rate of the flow in the chamber 2 is at its highest in the middle of the flow passage formed by the chamber, and at its lowest in the vicinity of the internal wall 7. For this reason air flow through the inner part of the electrode 5 arranged in the middle of the chamber must be prevented, because otherwise a considerable part of the gas to be purified would flow through the electrode 5. Due to the design of the electrode 5 ion beams cannot be formed in the middle of it, and no ionizing or purifying impact is achieved. Thus, the gas to be purified has an annular flow cross-section in the charging chamber 2, whereby gas flows in the vicinity of the inner wall of the flow passage, but not at the electrode 5 in the middle section of the chamber 2. This is achieved such that the electrode 5 may, with regard to the volume of the charging chamber 2, e.g. at least at one end be a closed tube or a solid bar which cannot be traversed by the gas flow. The shape of the charging chamber 2 affects the position of the electrode 2 inside the flow passage. In a flow passage having a round cross-section, for example, the electrode 2 is advantageously arranged in the centre of the charging chamber 2, whereby the distance between the electrode 5 and the wall 7 of the flow passage is the same at each point.

A more detailed description of the above-cited charging chamber can be found in PCT Application No. FI99/00315.

The arrangement according to the invention functions as described below.

Air flows into the charging chamber 2 which is provided with an electrode 5 of the above-described kind. An electric field is formed from the electrode tips 6 towards the grounded wall 7 of the charging chamber and when entering this field, the particles in air are powerfully charged and begin to move towards the wall 7 and adhere thereto. In addition to solid particles, water droplets and other liquid droplets are efficiently charged and extensively removed from the air flow at this early stage in the purification process. Particularly the removal of humidity is efficient. As a high voltage of e.g. 50 to 250 kV is used for ionization, the electric field formed is very strong and has good ionization efficiency. A strong electric field is also efficient at conveying the ionized particles and droplets. Next, the air flows to the electric precipitators 3, arranged at a distance from the charging chambers 3, where the powerfully charged particles are collected onto the filter 3 plates. It is possible that all particles or a great portion thereof are collected from the air flow already in the charging chamber 2, whereby no significant amount of particles reaches the plate filter. From the point of view of water separation it is of importance that the powerful electric field with its corona discharges exposes the air and the humidity contained in the air to a lot of energy, thus causing some of the water to evaporate. The evaporated water will not hamper the operation of the gas turbine, and thus, the proportion of evaporated water reduces the amount of water in droplet form to be separated.

The invention aims at charging and collecting these charged particles as efficiently as possible by means of an electric precipitator. Here, the charging chamber is an efficient particle charger and a separator of larger particles, particularly fibers and water. The particles remaining in the intake air after the charging chamber are powerfully charged and the charged particles are collected by the filter sections, to which only a collector voltage is connected. The collector voltage is typically in the magnitude of a few kilovolts, e.g. 4 to 6 kV, and less than 10 kV, i.e. about one tenth or twentieth of the charging voltage. Generally speaking, an increase in the charging or corona voltage will improve the separation efficiency of a electric precipitator 3, as will an increase in the collecting voltage. Thus, by adjusting these, the equipment can be adapted to function optimally to take into account air quality, e.g. humidity content or dirt content, or in accordance with alterations in the of air used. An increased flow rate will impair separation capacity, wherefore it is advisable to increase the voltages applied. The polarity of the corona discharge is of little significance to the collection efficiency of the electric precipitator, and thus, either a negative or a positive discharge is applicable in the charging chamber.

Even solutions differing from the above-described embodiments are feasible within the scope of the invention. As stated above, the construction of flow passages, charging chambers and plate filter may be selected quite freely. What is essential, however, is that the ionization takes place in a space separated from that used for collecting the particles in order to allow the use of a sufficiently high voltage for the ionization without disturbing the function of the plate filter. Thus, the charging chamber must be adapted at a distance from the plate filter in the flow path of the air to be purified. The minimum distance must comprise an air gap which is wide enough to eliminate the risk of electric breakdowns between the electrodes in the charging chamber and the collector plates. As electric precipitators and charging chambers are quite large due to the considerable amount of air and are often advantageously arranged in a given position, this requirement is usually met on the basis of the structural demands of the flow passages. The dimensioning and number of the precipitators and charging chambers are of course determined by the amount of air required in the gas turbine. What is essential in the structure of the charging chambers is that the entire amount of air flowing therethrough must be exposed to an ionizing electric field.

What is claimed is:

1. A method for purifying intake air of a gas turbine, comprising:

feeding air into intake air passages of the gas turbine;

taking the air into at least one charging chamber arranged at a distance before at least one electric precipitator in a direction of air flow;

forming an electric field in the at least one charging chamber between at least two electrodes by connecting an ionization voltage between the at least two electrodes; and collecting particles contained in the air by at least one electric precipitator connected to a collection voltage, wherein the ionization voltage exceeds the collection voltage.

2. The method according claim 1, wherein the collection voltage is at a maximum of 10 kV and the ionization voltage is at a minimum of 100 kV.

3. The method according claim 2, wherein the collection voltage is at a maximum of 10 kV and the ionization voltage is at 100 to 250 kV.

4. The method according to claim 1, wherein the electric field in the charging chamber is formed using at least one electrode comprising at least one needle electrode tip.

5. The method according to claim 1, which further comprises spraying water into the intake passages to cool down the intake air.

6. The method according to claim 1, which further comprises removing at least an amount of water from the intake air in the charging chamber sufficient to prevent freezing in the air intake passages.

7. The method according to claim 1, which further comprises forming an electric filed in the charging chamber by means of at least one of the electrodes comprising several electrode needle-tips to form at least two at least partially overlapping beam fields.

8. The method according to claim 1, wherein the ionization voltage is about 50–250 kV.

9. The method according to claim 1, wherein the collection voltage is less than about 10 kV.

10. The method according to claim 1, wherein the collection voltage is about 4 to 6 kV.

11. An arrangement of purifying intake air of a gas turbine, comprising:

a system of air intake passages;

at least one electric precipitator arranged in the air intake passages prior to a gas turbine compressor in a flow direction of air, the intake air being adapted to flow through filters, and a collection voltage being connectable to said filters to collect particles contained in the air; and means for ionizing the intake air prior to a collection filter, wherein the means for ionizing the intake air comprise at least one charging chamber containing at least two electrodes, between which the air is adapted to flow and between which an ionization voltage exceeding the collection voltage of a plate filter can be connected.

12. The arrangement according claim 11, wherein the collection voltage is 10 kV at most and the ionization voltage at least 100 kV.

13. The arrangement according to claim 12, wherein the collection voltage is 10 kV at the most and the ionization voltage at 100 to 250 kV.

14. The arrangement according to claim 11, wherein at least one electrode is arranged in at least one charging chamber, the electrode having at least one needle electrode tip.

15. The arrangement according to claim 11, further comprising means for spraying water into the intake passages for cooling down the intake air.

16. The arrangement according to claim 11, further comprising at least one electrode arranged in at least one charging chamber, said electrode having several needle electrode tips for the formation of at least partly overlapping beam fields.

17. A method for purifying the intake air of a gas turbine, comprising:

feeding air into intake air passages of the gas turbine;

taking the air into at least one charging chamber arranged at a distance before at least one electric precipitator in a direction of air flow;

forming an electric field in the at least one charging chamber between at least two electrodes by connecting an about 50 to 250 kV ionization voltage between the at least two electrodes; and collecting particles contained in the air by at least one electric precipitator connected to a collection voltage, wherein the ionization voltage exceeds the collection voltage.

18. The method according to claim 17, wherein the collection voltage is less than about 10 kV.

19. The method according to claim 17, wherein the collection voltage is about 4 to 6 kV.

20. An arrangement of purifying intake air of a gas turbine, comprising:

a system of air intake passages;

at least one electric precipitator arranged in the air intake passages prior to a gas turbine compressor in a flow direction of air, the intake air being adapted to flow through filters, and a collection voltage being connectable to said filters to collect particles contained in the air; and an ionizer for ionizing the intake air prior to a collection filter, wherein the ionizer for ionizing the intake air comprise at least one charging chamber containing at least two electrodes, between which the air is adapted to flow and between which an about 50 to 250 kV ionization voltage exceeding the collection voltage of a plate filter can be connected.

21. The arrangement according to claim 20, wherein the collection voltage is less than about 10 kV.

22. The arrangement according to claim 20, wherein the collection voltage is about 4 to 6 kV.

* * * * *